United States Patent [19]

Joh

[11] 4,322,381

[45] Mar. 30, 1982

[54] METHOD OF MANUFACTURING HOLLOW FIBER

[75] Inventor: Yasushi Joh, Yokohama, Japan

[73] Assignee: Nippon Zeon Co., Ltd., Tokyo, Japan

[21] Appl. No.: 213,874

[22] Filed: Dec. 8, 1980

Related U.S. Application Data

[63] Continuation-in-part of Ser. No. 916,964, Jun. 19, 1978, abandoned, which is a continuation-in-part of Ser. No. 754,973, Dec. 28, 1976, abandoned.

[30] Foreign Application Priority Data

Dec. 29, 1975 [JP] Japan ................................ 50-156316
Jul. 8, 1976 [JP] Japan .................................. 51-81570

[51] Int. Cl.³ .............................................. B29D 27/00
[52] U.S. Cl. ..................................... 264/41; 210/500.2; 264/561; 264/187; 264/203; 264/209.1; 428/398
[58] Field of Search ............... 264/177 F, 49, 41, 203, 264/561, 209.1, 187; 210/500.2; 428/398

[56] References Cited

U.S. PATENT DOCUMENTS

| 1,864,006 | 6/1932 | Weingand | 425/71 |
| 3,674,628 | 6/1972 | Fabre | 264/182 |
| 3,724,672 | 4/1973 | Leonard et al. | 210/500 |
| 3,930,105 | 12/1975 | Christen et al. | 428/398 |
| 3,975,478 | 8/1976 | Leonard | 264/41 |
| 4,035,459 | 7/1977 | Kesting | 264/49 |
| 4,127,625 | 11/1978 | Arisaka et al. | 264/28 |

FOREIGN PATENT DOCUMENTS 49-64573 6/1974 Japan .

Primary Examiner—Jay H. Woo
Attorney, Agent, or Firm—Hill, Van Santen, Steadman, Chiara & Simpson

[57] ABSTRACT

A method of manufacturing a hollow fiber which involves preparing a spinning solution of a non-polar water miscible organic solvent and a high molecular weight organic compound consisting of cellulose esters, polymethylmethacrylate, polyvinyl chloride, or poly-γ-benzyl glutamate, extruding the solution through an annular slit, and simultaneously extruding a neutral aqueous salt solution from an orifice encircled by the slit, the solution having a salt content of 15 to 50% by weight and being capable of developing a phase separation with the water miscible organic solvent by means of a salting out effect. The extruded spinning solution is passed substantially downwardly in a vertical direction into an aqueous coagulating bath, the annular slit being separated from the bath by at least 5 mm, the distance being sufficient to cause significant evaporation of the solvent from the spinning solution.

6 Claims, No Drawings

METHOD OF MANUFACTURING HOLLOW FIBER

REFERENCE TO RELATED APPLICATIONS

This application is a continuation-in-part of my copending application Ser. No. 916,964, filed June 19, 1978, now abandoned, which was a continuation-in-part of my application Ser. No. 754,973, filed Dec. 28, 1976, now abandoned, and entitled "Hollow Fiber and Method of Manufacturing the Same".

BACKGROUND OF THE INVENTION

1. Field of the Invention

This invention relates to an improved hollow fiber of high molecular weight, and to a method of manufacturing the same which involves preparing a spinning solution with a non-polar solvent, extruding the solution, and simultaneously extruding a neutral aqueous salt solution from an orifice encircled by the spinning solution being extruded, so that a phase separation takes place by means of a salting out effect.

2. Description of the Prior Art

Recently, semipermeable hollow fibers have been used for blood dialysis, for fluid separators based on the principles of ultrafiltration, and reverse osmosis. Such a hollow fiber should have a uniform configuration because when used, for example, for blood dialysis, the pressure in the interior of the hollow fiber is usually positive compared to that at the exterior. If the hollow fiber is not uniform in thickness, there is a possibility that the hollow fiber may be broken at its thinnest part. Also, it is known that when the cross section of the hollow fiber departs significantly from that of a true circle, blood is apt to coagulate in the hollow fiber.

When the hollow fiber is used for reverse osmosis, high pressures up to 100 atmospheres may be applied to the outside of the hollow fiber. In this event, it is necessary that the cross section of the hollow fiber should approximate a true circle and that the thickness of the wall of the hollow fiber be uniform. Otherwise, the hollow fiber can become crimped and useless. If the cross section of the hollow fiber is not uniform, the polarized concentration due to nonuniform flow substantially reduces the permeability performance of the fiber.

One procedure for the manufacture of hollow fibers involves extruding a spinning solution from an annular slit of a double pipe orifice, forming a sheath solution, and simultaneously, a gaseous or liquid fluid is extruded from the inner pipe of the double pipe orifice to form a core fluid. Where the manufacturing method uses a gaseous material as a core fluid, the resulting hollow fiber is apt to be crushed because the direction of the filament after being spun is changed by means of a guide bar in the coagulation bath and the washing bath. Thus, the running filament may be strongly pressed on the guide bar and likely to become deformed.

These disadvantages are substantially reduced by using a melt spinning procedure. However, it is known that using this procedure makes it difficult to produce a hollow fiber having a favorable selective permeability.

In using a wet spinning process, the spinning conditions such as concentration, coagulation bath conditions, and the like can be widely varied. On the other hand, it is difficult to produce a hollow fiber of uniform shape and productivity of this type of process is usually very low because of the low speed of spinning.

In the method in which a core liquid is extruded instead of a gaseous core fluid, the deformation of the running filament at the guide bar is considerably avoided. However there may be another problem developed, that is, a rapid coagulation of the sheath spinning solution develops by the instantaneous diffusion of the core liquid into the sheath dope immediately after being spun. Specifically, a thin skin layer is first formed on the inner interface of the spun sheath in contact with the core liquid, and another thin layer is formed on the outer surface of the sheath by contact with the coagulation bath liquid when the running filament is introduced into the coagulation bath. These two layers determine the dimensional configuration of the hollow fiber, and subsequent coagulation between the two layers usually develops numerous macro-voids in the membrane of the hollow fiber. These voids serve to scatter light and, as a result, the resultant hollow fiber looks whitish. A desired selective permeability cannot be obtained from such a fiber because the membrane has unfavorable macro-voids instead of desired micro pores. Furthermore, the spinnability is very poor because of the rapid coagulation of the spinning solution immediately after being spun. The hollow fiber, which is obtained at a very slow speed, on the order of 15 meters per minute at the most, has very poor mechanical properties. Also, the skin layers formed on both the inner and outer surfaces of the hollow fiber lower the permeability.

A dry jet-wet spinning method in which the spinning solution is extruded into a gaseous space and then is introduced into a coagulation liquid is considered to be preferable for producing hollow fibers having good permeability characteristics. In this method, a spinning solution or dope is extruded from an annular slit to form a sheath, and the extruded sheath passes through a gaseous space before being introduced into a coagulation bath. The gaseous space may be filled with an inert gas or air, and it may contain the vapor of the solvent of the spinning solution.

The core liquid is preferably non-coagulative at least before the spun solution is introduced into a coagulation bath. For example, in the production of cellulose hollow fibers by the cuprammonium process, the core liquids may consist of materials such as benzene, toluene, trichloroethylene, n-hexane, or perchloroethylene, which are not miscible with water. In this type of procedure, the organic core liquid must be removed from the hollow fiber in succeeding steps, which involves long, troublesome operations. Furthermore, from the standpoint of pollution problems, the use of such toxic organic solvents is not favored.

When the hollow fiber is to be used for medical purposes such as in blood dialysis and for any process involving foods, for example, such as the concentration of juice, the above mentioned toxic organic materials should be completely washed out from the hollow fiber.

In the patented art, U.S. Pat. No. 3,799,356 describes the manufacture of hollow fibers from quaternized hollow fiber membranes of polymers containing a sufficient amount of a vinyl pyridine to be non-thrombogenic.

U.S. Pat. No. 3,930,105 describes another method for continuously extruding hollow fibers from an acrylonitrile polymer in which the polymer is extruded or dissolved in a highly polar organic solvent.

Other types of hollow fibers and methods for their manufacture are described in U.S. Pat. Nos. 3,933,653; 3,944,485; and 3,674,628.

SUMMARY OF THE INVENTION

The present invention provides a method for the production of improved hollow fibers which involves preparing a spinning solution of a non-polar water miscible organic solvent and a high molecular weight compound which may be a cellulose ester, polymethylmethacrylate, poly vinyl chloride or poly-γ-benzyl glutamate. This spinning solution is extruded through an annular slit while simultaneously, a neutral aqueous salt solution is extruded from an orifice which is encircled by the slit. The salt solution has a salt content of 15 to 50% by weight and is capable of developing a phase separation with the water miscible organic solvent by a salting out effect. The extruded spinning solution is then passed substantially downwardly into an aqueous coagulating bath, the annular slit being separated from the bath by at least 5 mm. This distance is sufficient to cause significant evaporation of the solvent from the spinning solution.

DESCRIPTION OF THE PREFERRED EMBODIMENTS

A hollow fiber having a uniform configuration and a circular cross section can be obtained with excellent spinnability and high productivity in accordance with the procedure of the present invention.

Examples of cellulose esters which can be used for the purpose of the present invention are cellulose acetate, cellulose butyrate, cellulose propionate, cellulose acetate butyrate, and cellulose acetate propionate. The degree of acetylation is usually 30% to 65% for cellulose acetate and other carboxylic acid derivatives. Esters of other acids can also be used, such as esters of nitric acid and sulphuric acid, among others. For example, methyl cellulose having 38% methoxy groups, ethyl cellulose containing 46% ethoxy groups, oxyethyl cellulose, benzyl cellulose, cyano ethyl cellulose, sulphuric cellulose and phosphoric cellulose can also be used.

In accordance with the present invention, one or more high molecular weight compounds consisting of cellulose esters, polymethylmethacrylate, poly vinyl chloride, or poly-γ-benzyl glutamate are dissolved in a non-polar organic solvent which is miscible in water and has a dipole moment less than $3 \times 10^{-18}$ esu. Such solvents may include acetone, γ-butyl lactone, methyl ethyl ketone, methyl acetate, methyl lactate, ethyl lactate, dioxane, tetrahydrofuran, methylene chloride, methyl Cellosolve, methyl Cellosolve acetate, nitromethane, nitropropane, furfural, or mixed solvents containing these materials. Typical solvent mixtures may be nitromethane-methanol (8:2), nitropropane-ethanol (7:3), nitropropane-methanol (8:2), methylene chloride-ethanol (9:1), ethylene dichloride-ethanol (9:1), acetone-ethanol (9:1), acetone-water, acetone-triethylene glycol or the like. Solvents having higher dipole moments can be mixed with lower dipole moment solvents to bring the dipole moment below $3 \times 10^{-18}$ esu.

When the spinning solution in the conventional process is introduced into a bath containing water, mutual diffusion occurs between the solvent in the spinning solution and water. A thin layer is formed on the surface layer of the spinning solution due to the strong coagulating effect of water. Then, coagulation proceeds from the inside, replacing the solvent of the spinning solution with water and coagulation is completed with the development of macro-voids making the resulting fiber whitish. This formation of macro-voids reduces the spinnability seriously, and the take-up speed of the spun filament is, at most, 10 to 20 m/min. The mechanical strength of the resulting fiber is very low and the fiber is brittle.

The present invention is based upon the discovery that satisfactory results can be obtained by using special conditions for spinning. A substantially neutral (pH 6 to 8) salt solution is used as the core liquid in the production of the hollow fiber. The spinning solution which consists of the high molecular weight compound dissolved in a non-polar solvent is extruded from an annular slit to form a sheath and simultaneously, the aqueous salt containing neutral core liquid is extruded into the interior portion of the spun sheath. The key to obtaining a successful result is the utilization of the principle of salting out. The solvent of the spinning solution and the aqueous solution of the core are separated from each other into phases by the phenomenon. Accordingly, unfavorable mutual diffusion between the core liquid and the sheath is suppressed. This acts to reduce the formation of unfavorable macro-voids in the membrane of the hollow fibers. The spinnability is substantially improved and the spinning velocity take-up speed can be 180 m/min. or more. The membrane of the hollow fiber is lustrous and rather transparent. The mechanical strength is also satisfactory. The hollow fiber thus produced has very good selective permeability.

Many different types of salts can be used in the core liquid in concentrations ranging from 15 to 50% by weight. Examples of suitable salts are lithium chloride, lithium bromide, sodium salts such as sodium chloride, sodium bromide, sodium sulfate, sodium sulfite, sodium nitrate, sodium chlorate, sodium carbonate, sodium dihydrogen phosphate, sodium hydrogen phosphate, sodium phosphate, sodium nitrite, and sodium thiocyanate. Suitable ammonium salts include ammonium chloride, ammonium bromide, ammonium sulfate, ammonium nitrate, ammonium carbonate, and ammonium thiocyanate. As examples of potassium salts, there are potassium chloride, potassium bromide, potassium sulfite, potassium hydrogen sulfate, potassium chlorate, potassium nitrite, potassium nitrate, potassium thiocyanate and the like. Useful magnesium salts include material such as magnesium chloride, magnesium bromide, magnesium bromate, magnesium sulfate, magnesium hydrogen sulfate, magnesium chlorate, and magnesium nitrate. Suitable calcium salts include calcium chloride, calcium iodide, calcium hypophosphate, calcium nitrate, calcium nitrite, calcium phosphate, and calcium dihydrogen phosphate. In addition to the above named salts, cadmium chloride, cadmium nitrate, zinc chloride, zinc sulfate, and zinc nitrate can be used. The inorganic salt must be sufficiently soluble in water to achieve at least the minimum concentration sufficient to exhibit the salting out effect which makes the core solution and the solvent of the sheath separate into two phases.

In addition to inorganic salts, organic salts may also be used for example, suitable salts include organic carboxylic acid salts, alcoholates, phenolates, and organic sulfonic acid salts. In addition, the sodium, potassium, ammonium, or calcium salts of the following acids can be used: citric acid, tartaric acid, formic acid, acetic acid, butyric acid, succinic acid, stearic acid, benzoic acid, propionic acid, oxalic acid, malonic acid, valeric acid, capronic acid, lauric acid, myristic acid, palmitic acid, acrylic acid, glutaric acid, adiptic acid, maleic acid, fumaric acid, glycolic acid, lactic acid, malic acid, pyruvic acid, acetoacetic acid, and levulinic acid.

Suitable alcoholates include sodium methoxide and sodium ethoxide. As examples of phenolates, there are sodium phenoxide, and potassium phenoxide. As examples of organic sulfonic acid salts, there are sodium benzene sulfonate, sodium p-toluene sulfonate, potassium p-toluene sulfonate, ammonium benzene sulfonate, sodium benzene sulfonate, and potassium benzene sulfonate.

To make the salt solution neutral, it is, of course, possible to add either acidic or basic buffers.

As an example of the manufacture of the hollow fiber according to this invention, the spinning solution is extruded downward and substantially vertically from the annular slit of a nozzle, and the spun filament is led into a coagulating bath after the running filament passes through a gaseous space of at least 5 mm in length. A hollow fiber having a uniform circular cross section can thus be obtained. The outside and inside diameter in cross section, and the thickness of the membrane of the fiber can be easily controlled by adjusting the spinning conditions.

The hollow fibers produced according to the present invention do not present toxicity problems for medical use because water and non-toxic inorganic salts are used as a core solution. Moreover, there need be no recovery process for the core liquid since the process does not bring about any pollution.

As a typical example of operating under the present invention, an acetone solution of cellulose acetate can be used as a spinning solution and extruded from an annular slit of a nozzle to form a sheath. Simultaneously, an aqueous calcium chloride solution containing up to 48% by weight calcium chloride is extruded into the hollow portion of the sheath to form the core solution. The spun filament is led into a coagulation bath, desirably a water bath, after passing a gaseous space longer than 5 mm, for example, about 30 cm in length. During the passage of the filament through the gaseous space before being introduced into the coagulation bath, significant evaporation of the solvent from the spinning solution occurs. The contact between the core solution and the spinning solution causes the materials to be separated into two phases. The take-up speed of the fiber at the take-up roll can be increased to 180 m/min. in these circumstances. When the filament is led into the coagulation bath, mutual diffusion takes place between the acetone in the spinning solution and the water in the bath at the outer surface of the filament. The outer surface is rapidly coagulated by the strong coagulating action of the water. Subsequently, the outer portions close to the surface of the filament are then subjected to coagulation. Then, the acetone in the spinning solution is replaced with the penetrating water to develop favorable micro-pores in the membrane of the hollow fiber.

In the coagulation bath, the concentration of acetone in the sheath decreases as the water from the coagulation penetrates inside the sheath. This results in the disappearance of the phase separation, allowing mutual diffusion between the core and sheath solutions to begin. This process produces very favorable micro-pores in the membrane of the hollow fiber. Based on the principle of osmosis, the water is percolated into the hollow portion of the fiber from the outside so as to lower the concentration of salt in the aqueous core solution. As a result, the interior portion of the hollow fiber achieves a positive pressure which helps to maintain a circular cross section in the resulting hollow fiber. Furthermore, the hollow fiber does not deform at the guide bar when its direction is changed.

According to the present invention, ideal pores can be provided in the membrane of the hollow fiber. This is partly explained by the fact that the aqueous core solution containing the salt moves toward the outside of the membrane with the disappearance of phase separation by the principles of diffusion and dialysis. Another reason is that water penetrates into the hollow portion through the membrane from the outside so as to lower the concentration of salt in the core solution based on the principle of osmosis.

The nature of the aqueous core solution, namely the kind and concentration of salt can be widely changed within the specified range of concentration to develop the phase separation between the core solution and the solvent of the spinning solution. The salting out phenomenon is different, depending on the type of salt, kind of cation or anion of the salt, and also on the nature of the non-polar solvent used in the spinning solution.

The behavior of mutual diffusion between the aqueous core solution and the solvent of the sheath is also different, depending on the kind and bulkiness of the cation or anion. Thus, by selecting suitable conditions, the permeability of the resulting hollow fiber can be widely varied.

The distance between the extruded filament and the surface of the coagulating bath can also be varied. If desired, a positive action to evaporate the solvent from the running filament to a desired extent can be done before the filament is introduced into the coagulation bath.

The following examples illustrate various means of producing the hollow fibers of the present invention, and these are compared with prior art examples referred to as reference examples.

REFERENCE EXAMPLE 1

A spinning solution was made up from 30 parts of cellulose acetate having a mean degree of polymerization of 150 and a degree of acetylation of 39.8% and a mixed solvent containing 60 parts of acetone and 10 parts of triethylene glycol. The spinning solution was extruded into a gaseous medium by a constant feeding pump from an annular slit. The slit had an external diameter of 2.0 mm and an internal diameter of 1.4 mm. Water was extruded simultaneously from an inner orifice positioned concentrically with the annular slit. The spinning solution extruded from the annular slit instantaneously became whitish and had very poor thread forming property. The fiber obtained was very brittle and practically useless. The reason was that a mutual diffusion had rapidly developed between the extruded sheath spinning solution and the water in the core liquid so that numerous unfavorable macro-voids were developed in the membrane of the fiber. The take-up speed of the fiber was at most about 13 m/min.

REFERENCE EXAMPLE 2

A ternary copolymer of a acrylonitrile-methylacrylatemethallyl sulfonic acid (93:3:4) having an intrinsic viscosity of 1.6 dl/g in dimethyl formamide at 30° C. was dissolved in dimethyl formamide, a polar solvent, to prepare a 30% spinning solution.

The spinning solution was extruded into a mixed coagulating bath of dimethyl formamide and water from an annular slit. This slit had an external diameter of 1.5 mm and an internal diameter of 1.0 mm. Simultaneously, a 3% sodium phosphate aqueous solution was extruded from the inner orifice. The filament extruded from the orifice instantaneously became whitish and had a very poor thread forming property. The results were the same even when the conditions of the spinning operation were changed.

A similar result was obtained when 28 parts of cellulose acetate having a mean degree of polymerization of 180 and a degree of acetylation of 40% were dissolved in a mixed solvent of 60 parts acetone and 10 parts of triethylene glycol to prepare a spinning solution, and a 3% sodium chloride solution was used as the core solution.

EXAMPLE 1

Cellulose acetate having a mean degree of polymerization of 150 and a degree of acetylation of 39.8% in an amount of 30 parts was dissolved in a mixed solvent of 60 parts of acetone and 10 parts of triethylene glycol to prepare a spinning solution. This solution at 35° C. was extruded by a constant feed pump from an annular slit having an external diameter of 2.0 mm and an internal diameter of 1.4 mm. Simultaneously, a 20% sodium chloride aqueous solution was introduced into the inner orifice as a core solution. The extruded filament was passed through a spinning cell having a length of 1 m in which a nitrogen gas at 70° C. was counter-currently flowing at a rate of 1 m/sec. Next, it was introduced into a coagulating water bath.

The spinnability of the fiber was excellent, and the filament could be wound up on a take-up roll with a maximum speed of 180 m/min. The fiber thus obtained has a tensile dry strength of 2.1 g/d and was very uniform.

EXAMPLE 2

A spinning solution was made up from 28 parts of cellulose acetate having a mean degree of polymerization of 185 and a degree of acetylation of 40% dissolved in a mixed solvent of 69 parts of acetone and 3 parts of water. The spinning solution at 38° C. was extruded as a sheath from an annular slit having an external diameter of 1.5 mm and an internal diameter of 1.0 mm. Simultaneously, an aqueous solution containing 30% sodium chloride was extruded as a core solution. The extruded material was passed through a spinning cell having a length of 2 m in which a nitrogen gas at 90° C. was countercurrently flowing at a rate of 1.2 m/sec. Then the filament was introduced into a coagulating bath of an aqueous solution containing 20% acetone. The fiber was subsequently washed by a 1% acetic acid aqueous solution. The spinnability was excellent, and a uniform hollow fiber having a cross section very nearly a true circle was obtained with a take-up speed of 175 m/min. The fiber had a dry strength of 2.0 g/d.

EXAMPLE 3

A spinning solution was made up from 28 parts of cellulose acetate having a mean degree of polymerization of 180 and a degree of acetylation of 39.8% in a mixed solvent of 69 parts of acetone and 3 parts of ethanol. The spinning solution at 40° C. was extruded as a sheath and simultaneously a 25% calcium chloride aqueous solution was used as a core solution. The spinnability was excellent, and a uniform fiber having a dry strength of 1.9 g/d and nearly true circular cross section was obtained with a take-up speed of 189 m/min.

EXAMPLE 4

Cellulose acetate having a mean degree of polymerization of 150 and a degree of acetylation of 39.8%, in an amount of 30 parts, was dissolved in a mixed solvent of 60 parts of acetone and 10 parts of triethylene glycol to prepare a spinning solution. This solution was extruded into a mixed bath of water-acetone (75:25) at 30° C. and simultaneously a 35% calcium chloride aqueous solution was extruded from the inner orifice. The spinnability was satisfactory and a uniform hollow fiber was obtained.

EXAMPLE 5

A spinning solution was made up from 22 parts of cellulose triacetate having a mean degree of polymerization of 360 and a degree of acetylation of 60.5% and a mixed solvent consisting of methylene chloride and methanol (90:10). The core solution was a 20% calcium chloride aqueous solution.

A hollow fiber having a superior reverse osmosis performance was obtained with a maximum take-up speed of 246 m/min. The fiber was uniform in cross section and was close to a true circle.

EXAMPLE 6

A spinning solution was made up from 26 parts of crushed polymethylmethacrylate plate dissolved in 74 parts of acetone. A 25% calcium chloride aqueous solution was used as a core solution. The extruded filament was subsequently passed through the spinning cell. The fiber was then washed with water and plasticized by glycerine before being dried at 30° C. The maximum take-up speed was 297 m/min. The hollow fiber obtained had a cross section similar to a true circle and had a very high uniformity. The fiber had a dry strength of 2.4 g/d. The ultrafiltration properties and the dialysis properties of the fiber were superior.

EXAMPLE 7

Polymethylmethacrylate having a mean molecular weight of 36,000 was dissolved in acetone to prepare a 20% spinning solution. This solution was extruded through an annular slit, and simultaneously an 18% sodium chloride aqueous solution was extruded from the inner orifice. The extruded filament was then passed through a space having a length of 1 cm. and then introduced into a coagulating bath of an acetone-water solvent to cause coagulation. The filament was subsequently washed with water before being dried. The take-up speed was 143 m/min. A rather transparent and strong hollow fiber was obtained. The fiber was found to have very good dialysis properties.

EXAMPLE 8

A commercial cellulose diacetate having a degree of polymerization of 151 and supplied by Eastman Kodak Corporation was dissolved in acetone to prepare a spinning solution. The solution was maintained at 30° C. and was extruded from an annular slit vertically downwardly at a rate of 1.7 ml/min. and simultaneously an aqueous solution containing 23% calcium chloride was extruded as a core liquid from the orifice encircled by the annular slit.

The spinnability of the fiber was very good. The extruded filament was introduced into a water bath at 30° C., with the surface of the bath being 30 cm below the nozzle. In the water bath, the fiber ran about 3 meters substantially in the horizontal direction. The course of the running filament was changed by a guide bar. The fiber was then wound up on a take-up roll. Even when the take-up speed was raised progressively to 160 m/min. the fiber could be wound up very stably without any breaking of the filament.

EXAMPLE 9

The spinning conditions were the same as those in Example 8 except that the distance between the nozzle surface and the coagulating bath surface was changed. The cross sectional configurations of the resultant fibers was observed. These results are given in the following table, which indicates that the deformation of the fiber becomes greater when the distance between the nozzle surface and the coagulation bath surface is less than 5 mm.

| Distance between nozzle surface and coagulating bath surface | Maximum winding-up speed (m/min) | Shape of cross section (Uniformity of membrane thickness) | Degree of flatness |
| --- | --- | --- | --- |
| 2 mm | 60 | bad | rather flat |
| 4 mm | 80 | " | flat |
| 6 mm | 102 | fairly good | almost true circle |
| 20 mm | 150 | good | true circle |
| 50 mm | 160 | " | " |
| 100 mm | 162 | " | " |
| 150 mm | 160 | " | " |
| 200 mm | 170 | " | " |
| 250 mm | 170 | " | " |
| 300 mm | 170 | " | " |
| 500 mm | 180 | " | " |
| 1 m | 260 | " | " |
| 2 m | 300* | " | " |
| 3 m | 500 | " | " |
| 7 m | 560* | " | " |

*The solvent was positvely vaporized under a supply of hot air.

EXAMPLE 10

Chips of a commercial polymethylmethacrylate were dissolved in acetone to prepare a spinning solution. The spinning conditions were the same as in Example 8 except that a 21% ammonium chloride aqueous solution was used as the core liquid.

The extruded filament was introduced into a water bath after being passed through a gaseous space having a vertical length of 43 cm. and then wound up on a roll. The hollow fiber obtained had an almost uniform cross section close to a true circle. The distance between the nozzle and the coagulating bath surface was changed and the maximum wind-up speed in the cross section of the fiber were observed.

It was found that the maximum wind-up speed was more than 90 m/min. in all cases when the distance of the filament between the orifice and the coagulation bath was more than 5 mm. The wind-up speed was sharply decreased and became 40 m/m or less when the distance of the filament was less than 5 mm. Furthermore, the cross section became flat and deformed.

EXAMPLE 11

In this Example, 22 parts of cellulose triacetate having a mean degree of polymerization of 360 and a degree of acetylation of 60.5 were dissolved in a mixed solvent consisting of methylene chloride and methanol (90:10) to prepare a spinning solution. This solution was extruded from an annular slit while simultaneously a 20% sodium phosphate aqueous solution was extruded from an inner orifice. The hollow fiber had very stable spinnability and had a transparent appearance.

After a large amount of solvent was vaporized, the filament was introduced into a water-methanol bath (90:10) and further dipped in water for a time sufficient to remove the sodium phosphate by dialysis and then dried at 60° C. to a constant length.

The hollow fiber thus obtained evidenced excellent performance as a reverse osmosis membrane. An analysis showed that hydrolysis had occurred at the inner wall surface of the hollow fiber, so that the inner wall surface was hydrolyzed to substantially cellulose and the degree of hydrolysis decreased in going from the inner wall surface to the external wall surface.

It should be evident that various modifications can be made to the described embodiments without departing from the scope of the present invention.

I claim as my invention:

1. A method of manufacturing a hollow fiber which comprises providing a spinning solution of a water miscible organic solvent having a dipole moment less than $3 \times 10^{-18}$ esu and a high molecular weight compound consisting of a cellulose ester, polymethylmethacrylate, poly vinyl chloride, or poly-γ-benzyl glutamate, extruding the solution through an annular slit, simultaneously extruding a neutral aqueous salt solution from an orifice encircled by said slit, said solution having a salt content of 15 to 50% by weight and being capable of developing a phase separation with said water misicible organic solvent by a salting out effect, said salt solution and said spinning solution developing said phase separation without mutual diffusion and significant coagulation, and passing the extruded spinning solution substantially downwardly into an aqueous coagulating bath to initiate coagulation, the annular slit being separated from said bath by at least 5 mm, and sufficient to cause significant evaporation of the solvent from said spinning solution.

2. A method according to claim 1 in which said salt consists of at least one member of the group consisting of lithium salts, sodium salts, ammonium salts, potassium salts, magnesium salts, calcium salts, cadmium salts, zinc salts, organic carboxylic acid salts, alcoholates, phenolates, and organic sulfonic acid salts.

3. A method according to claim 1 in which the spinning solution contains a cellulose ester having a degree of acetylation of from 30 to 65%.

4. The method of claim 1 in which said aqueous salt solution is a solution of sodium chloride.

5. The method of claim 1 in which said aqueous salt solution is a solution of potassium chloride.

6. The method of claim 1 in which said aqueous salt solution is a solution of calcium chloride.

* * * * *